(12) United States Patent
White et al.

(10) Patent No.: US 10,931,735 B2
(45) Date of Patent: Feb. 23, 2021

(54) APPLICATION DISCOVERY

(71) Applicant: Netflix, Inc., Los Gatos, CA (US)

(72) Inventors: Jean-Marie White, Los Gatos, CA (US); Daniel Danciu, Adliswil (CH)

(73) Assignee: NETFLIX, INC., Los Gatos, CA (US)

( * ) Notice: Subject to any disclaimer, the term of this patent is extended or adjusted under 35 U.S.C. 154(b) by 1012 days.

(21) Appl. No.: 13/827,720

(22) Filed: Mar. 14, 2013

(65) Prior Publication Data

US 2014/0006474 A1 Jan. 2, 2014

Related U.S. Application Data

(60) Provisional application No. 61/675,756, filed on Jul. 25, 2012, provisional application No. 61/665,827, filed on Jun. 28, 2012.

(51) Int. Cl.
  *H04L 29/08* (2006.01)
  *H04N 21/4782* (2011.01)
  (Continued)

(52) U.S. Cl.
  CPC .......... *H04L 67/10* (2013.01); *H04L 67/025* (2013.01); *H04L 67/16* (2013.01);
  (Continued)

(58) Field of Classification Search
  USPC ........................................................ 709/201
  See application file for complete search history.

(56) References Cited

U.S. PATENT DOCUMENTS 6,618,593 B1 9/2003 Drutman et al.
6,725,281 B1 * 4/2004 Zintel ................. H04L 12/2803
                                                                  709/217
(Continued)

FOREIGN PATENT DOCUMENTS

JP    2010160748 A    7/2010
WO    2010023796 A1   3/2010

OTHER PUBLICATIONS

European Patent Office, "Search Report" in application No. 13174379. 1-1853, dated Sep. 9, 2013, 14 pages.
(Continued)

*Primary Examiner* — Kevin T Bates
*Assistant Examiner* — Ronak Patel
(74) *Attorney, Agent, or Firm* — Artegis Law Group, LLP

(57) ABSTRACT

The disclosure describes methods or communication protocols that enable second-screen applications, such as smartphones, to discover and launch first-screen applications on first-screen devices, such as Internet enabled high definition televisions. Second-screen devices can search local networks for the presence of discovery servers on first-screen devices. Well-known protocols such as RESTful HTTP services and Universal Plug and Play (UPnP) may be leveraged to implement the discovery servers. Once located, the discovery servers may assist communications and interactions between the first-screen and second-screen devices, allowing a specified application to be launched on the first-screen device and controlled from a local application on the second-screen device. The specified application may be installed if not previously installed, and may also be hosted as a web application on a cloud server accessible outside of the local network, for example on the Internet.

20 Claims, 7 Drawing Sheets

(51) Int. Cl.
*H04N 21/442* (2011.01)
*H04N 21/41* (2011.01)
*H04N 21/4363* (2011.01)
*H04N 21/47* (2011.01)
*H04N 21/478* (2011.01)
*H04N 21/462* (2011.01)

(52) U.S. Cl.
CPC ... *H04N 21/4126* (2013.01); *H04N 21/43637* (2013.01); *H04N 21/44227* (2013.01); *H04N 21/47* (2013.01); *H04N 21/4782* (2013.01); *H04N 21/4622* (2013.01); *H04N 21/478* (2013.01)

(56) References Cited

U.S. PATENT DOCUMENTS

| | | | |
|---|---|---|---|
| 7,206,853 B2* | 4/2007 | Eytchison | H04L 12/2803 709/201 |
| 8,028,323 B2 | 9/2011 | Weel | |
| 8,045,952 B2 | 10/2011 | Qureshey et al. | |
| 8,050,652 B2 | 11/2011 | Qureshey et al. | |
| 8,195,650 B2* | 6/2012 | Sheshagiri et al. | 707/722 |
| 8,209,398 B2* | 6/2012 | Moorer | H04L 65/4084 709/217 |
| 8,214,873 B2 | 7/2012 | Weel | |
| 8,230,099 B2 | 7/2012 | Weel | |
| 8,510,418 B2* | 8/2013 | Yu | H04N 7/17327 709/219 |
| 9,167,419 B2* | 10/2015 | Harrison | H04L 63/10 |
| 9,294,729 B2* | 3/2016 | Chen | H04N 21/25891 |
| 2003/0208595 A1* | 11/2003 | Gouge | H04L 69/329 709/225 |
| 2004/0027375 A1* | 2/2004 | Ellis | G06F 9/4445 715/753 |
| 2004/0088731 A1* | 5/2004 | Putterman | H04L 29/06027 725/94 |
| 2006/0248121 A1* | 11/2006 | Cacenco | H04L 67/28 |
| 2006/0258289 A1* | 11/2006 | Dua | G06F 16/44 455/41.3 |
| 2007/0288849 A1* | 12/2007 | Moorer | G06F 1/1626 715/736 |
| 2007/0288975 A1* | 12/2007 | Cashman | H04N 21/4126 725/110 |
| 2008/0307049 A1* | 12/2008 | Curran | H04L 29/12594 709/203 |
| 2009/0111453 A1* | 4/2009 | Hsu | G06F 8/61 455/419 |
| 2010/0121900 A1 | 5/2010 | Shimon et al. | |
| 2010/0153985 A1* | 6/2010 | Dey | H04N 21/41407 725/25 |
| 2010/0281103 A1* | 11/2010 | Imai | H04L 69/24 709/203 |
| 2011/0145581 A1* | 6/2011 | Malhotra | H04L 63/126 713/171 |
| 2012/0272148 A1* | 10/2012 | Strober | H04L 65/60 715/716 |
| 2013/0103842 A1* | 4/2013 | Seed | H04L 41/0213 709/227 |
| 2013/0152135 A1* | 6/2013 | Hong | H04N 21/4622 725/51 |
| 2013/0176491 A1* | 7/2013 | Kataoka et al. | 348/552 |
| 2013/0278484 A1* | 10/2013 | Hwang et al. | 345/2.3 |
| 2013/0291015 A1* | 10/2013 | Pan | 725/37 |
| 2014/0328251 A1* | 11/2014 | Hassan | H04L 12/2818 370/328 |

OTHER PUBLICATIONS

Current Claims in application No. 13174379.1-1853, Sep. 2013, 3 pages.
Team Xbmc: Pofficial XBMC Remote/iOS, Jun. 11, 2012, XP055076810, URL: http://web.archive.org/web20120611151708/ http://wiki.xbmc.org/index.php?title=Official_XBMC_Remote/iOS.
"X Display Manager (program type", Jun. 16, 2012, XP055076688, URL: http://en.wikipedia.org/w/index.php?title=X_display_manager_%28program_type%29&oldid=497826983.
UPNP Forum: "UPnP Device Architecture 1.1", Oct. 15, 2008, pp. I-VI, 1, XP002562314, URL: http://www.upnp.org/specs/arch/UPnP-arch-DeviceArchitecture-v1.1.pdf.
G. Messina "XBMC Remote/HostViewController.m", May 19, 2012, XP055076730, URL: https://raw.github.com/joethefox/Unofficial-Official-XMBC-Remote/9e8ce13181d6f4f5dbfd4caec48f7af552266cf1/ XBMC%20Remote/Hos.
Team Xbmc: "UPnP" Jun. 3, 2012, Xp055076843, URL: http:// web.archive.org/web/20120603002953/http://wiki.xbmc.org/index. php?title=Upnp.
Team Xbmc: "AirPlay—XBMC" Jun. 4, 2012, XP055076848, URL: http://web.archive.org/web/20120604103938/http://wiki.xbmc. org/index.php?title=AirPlay.
"xbmc/xbmc/interfaces/json-rpc/ServiceDescription.h", Mar. 29, 2012, XP055076700, URL: https://raw.github.com/xbmc/xbmc/ 76bd502bf007460d1317a3407b61de9bf9d5456c/xbmc/interfaces/ json-rpc/ServiceDescriptio.
"Dial—Discovery and Launch protocol specification—Version 1.6.4", Dec. 19, 2012, pp. 1-16, XP055076322, URL: http://www.dial-multiscreen.org/dial-protocol-specification/DIAL-2ndScreenProtocol-1.6.4.pdf.
European Patent Office, "Search Report" in application No. 13 174 379.1-1853, dated Apr. 19, 2016, 5 pages. European Claims in application No. 13 174 3793.1-1853, dated Apr. 2016, 3 pages.
"Does the Number of Applications Compatible with 'Air Play' Increase?", Mac Fan, vol. 19, No. 6, Mainichi Communications, Inc., Jun. 1, 2011, 4 pages.

* cited by examiner

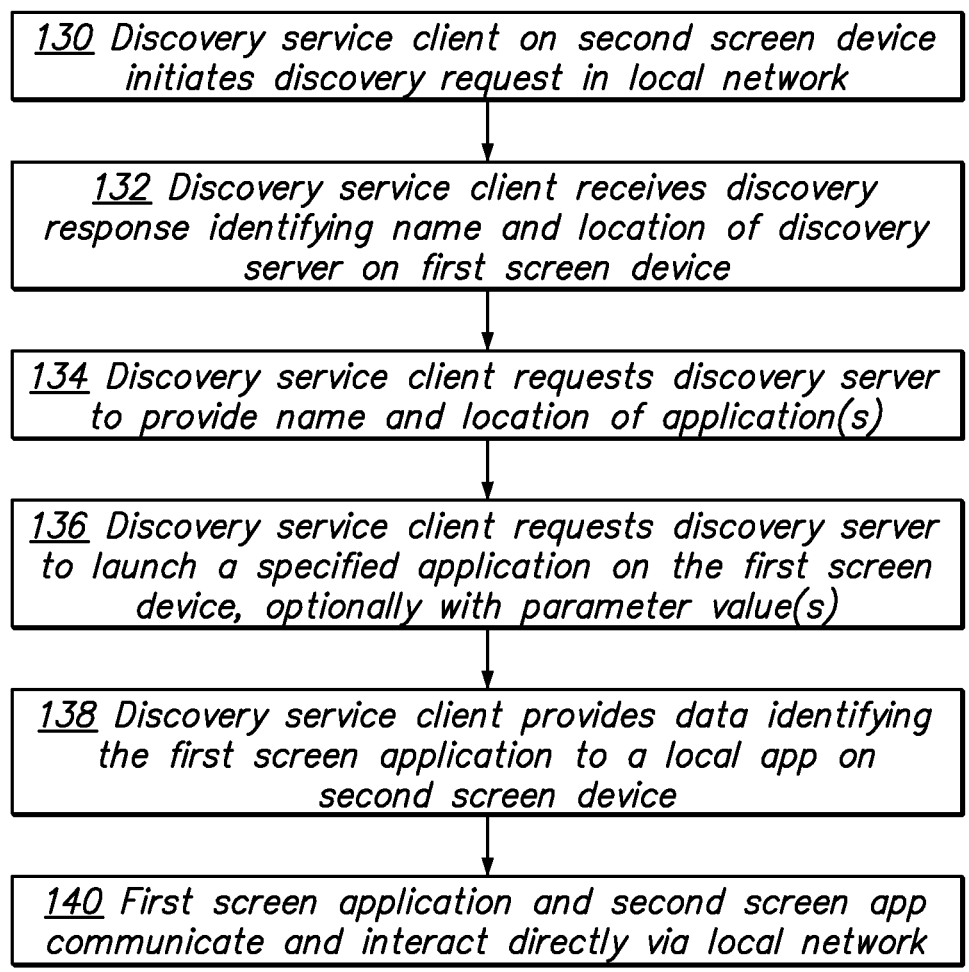

```
M-SEARCH * HTTP/1.1
HOST: 239.255.255.250:1900
MAN: "ssdp:discover"
MX: seconds to delay response
ST: urn:dial-multiscreen-org:service:dial:1
USER-AGENT: OS/version product/version
```

```
HTTP/1.1 200 OK
LOCATION: http://192.168.1.1:52235/dd.xml
CACHE-CONTROL: max-age=1800
EXT:
BOOTID.UPNP.ORG: 1
SERVER: OS/version UPnP/1.1 product/version
ST: urn:dial-multiscreen-org:service:dial:1
```

Message sent to 192.168.1.1,port 52235:

```
GET /dd.xml HTTP/1.1
...
```

```
HTTP/1.1 200 OK
Application-URL: http://192.168.1.1:12345/apps
...

<UPnP device description in message body>
```

Message sent to 192.168.1.1,port 12345:

```
POST /apps/YouTube
Content-Type: text/plain; charset="utf-8"
...
```

```
param1=value1¶m2=value2
```

*FIG. 8*

```
HTTP/1.1 201 CREATED
LOCATION: http://192.168.1.1:12345/apps/YouTube/run
...
```

*FIG. 9*

Message sent to 192.168.1.1,port 12345:

```
GET /apps/YouTube
...
```

*FIG. 10*

```
<?xml version="1.0" encoding="UTF-8"?>
<xs:schema targetNamespace="urn:dial-multiscreen-org:shemas:dial"
    attributeFormDefault="unqaulified"
    elementFormDefault="qaulified"
    xmlns:xs="http://www.w3.org/2001/XMLSchema"
    xmlns="urn:dial-multiscreen-org:schemas:dial"
    xmlns:atom="http://www.w3.org/2005/Atom">
<xs:import namespace="http://www.w3.org/2005/Atom"schemaLocation="atom.xsd"/>
<xs:element name="service" type="ServiceType"/>

<xs:complexType name="ServiceType">
    <xs:sequence>
        <xs:element name="name" type="xs:string" minOccurs="1" maxOccurs="1"/>
        <xs:element name="options" type="OptionsType" minOccurs="0" maxOccurs="1"/>
        <xs:element name="state" type="xs:string" minOccurs="1" maxOccurs="1"/>
        <xs:element name="link" type="atom:LinkType" minOccurs="0" maxOccurs="1"/>
    </xs:sequence>
</xs:complexType>

<xs:complexType name="OptionsType">
    <xs:attribute name="allowStop" type="xs:boolean" use="optional"/>
</xs:complexType>
</xs:schema>
```

*FIG. 11A*

```
HTTP/1.1 200 OK
...
<?xml version="1.0" encoding="UTF-8"?>
<service xmlns="urn:dial-multiscreen-org:schemas:dial">
    <name>YouTube</name>
    <options allowStop="true"/>
    <state>running</state>
    <link rel="run" href="run"/>
</service>
```

*FIG. 11B*

APPLICATION DISCOVERY

CROSS-REFERENCE TO RELATED APPLICATIONS

Benefit Claim

This application claims the benefit of provisional application 61/675,756, filed Jul. 25, 2012, and provisional application 61/665,827, filed Jun. 28, 2012, the entire contents of which are hereby incorporated by reference for all purposes as if fully set forth herein.

TECHNICAL FIELD

The present disclosure generally relates to techniques for discovering the presence of computer program applications in a network. The disclosure relates more specifically to application discovery techniques useful in coordinating first-screen audiovisual devices and second-screen computing devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Video-based entertainment systems in homes and commercial environments may include a variety of primary viewing systems such as televisions, digital video recorders, disc players, and set-top boxes that are compatible with cable or satellite television signaling systems. Such primary viewing systems often include complete special-purpose computers that are capable of hosting application programs relating to entertainment or other functions, and are usually capable of driving or displaying a program on a large-screen display or display unit. In the same environments, the use of other special-purpose computing devices and general purpose computing devices such as smartphones, tablet computers, laptop computers, netbook computers, and other computers and workstations is commonplace. However, while certain protocols are available for discovering devices on a local network, such as SSDP and Bonjour/mDNS, in current technology it has been difficult for applications hosted on the computing devices to identify, obtain data from, and coordinate operations with applications that may run on the primary viewing systems. As another example, a laptop computer on a local network may have no way to identify and then cause launching, on the primary viewing system, a particular entertainment-oriented computer program application that is hosted on the primary viewing system. Consequently, in the past users typically have had to interact directly with the primary viewing system to identify, launch, use, and shut down the applications that are hosted on the primary viewing system.

BRIEF DESCRIPTION OF THE DRAWINGS

In the drawings:

FIG. 1B illustrates a method of discovering applications according to an embodiment.

FIG. 8 illustrates an example application launch request.

FIG. 9 illustrates an application launch response.

FIG. 10 illustrates an Application Information Request.

FIG. 11A illustrates a XML schema for an application information response.

FIG. 11B illustrates an application information response.

DETAILED DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0 Technical Introduction

In an embodiment, the disclosure describes methods or communication protocols that enable second-screen applications to discover and launch first-screen applications on first-screen devices. One goal of the disclosure is to enable consumer electronics device owners to enjoy seamless integration of smartphone and tablet computer applications as part of an audiovisual-oriented entertainment experience.

1.1 Terminology

In this disclosure, the following terms may have the following meanings:

First screen: a television, disc player, set-top box, game console, digital video recorder, or similar device primarily capable of playing or generating a visual display of an audiovisual program. A first screen device is often a primary viewing system in the user environment.

Second screen: a smartphone, tablet computer, laptop computer, netbook computer, or other personal computing device. A second screen device is often a secondary viewing system but often has more powerful or generalized computing and input capabilities than the first screen device.

Discovery server: a computing device that hosts, executes or implements the server side of the protocols described herein. In one embodiment, the discovery server is a first screen device.

Discovery client: a computing device that can discover and request to launch computer program applications that are located or hosted on a discovery server. In one embodiment, the discovery client is a second screen device.

For purposes of illustrating clear examples, certain sections of this disclosure refer to certain commercially available services such as Netflix and YouTube, and refer to certain commercially available computing devices such as iPhone smartphones and Android-based tablet computers. However, the specific services and devices identified in the disclosure are stated merely as examples and other embodiments may be implemented in connection with any other form of computing device or application.

2.0 System Architecture

Figure 1A:
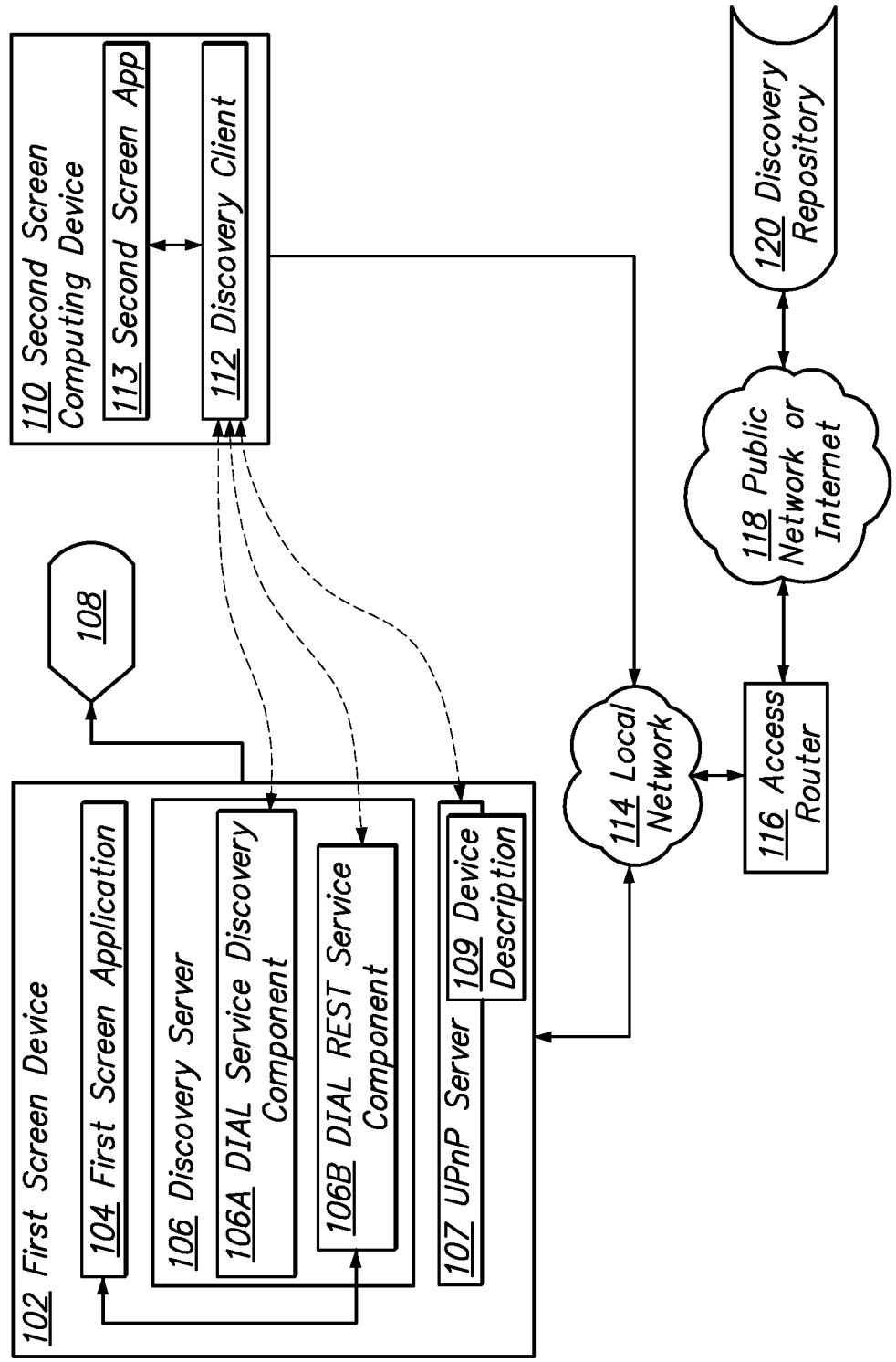
FIG. 1A illustrates a computer system architecture that may be utilized to implement various embodiments.

FIG. 1A illustrates a computer system architecture that may be utilized to implement various embodiments. In an embodiment, a first screen device 102 and a second screen computing device 110 are coupled to a local network 114. For example, first screen device 102 may comprise a processor-equipped television, set-top box, game console, digital video recorder, disc player, or other element of consumer electronics that includes or is capable of driving a video display 108. First screen device 102 hosts and executes a first screen application 104 and a discovery server 106. Any number of first screen applications 104 may be supported in various embodiments and a single first screen application is shown in FIG. 1A merely to illustrate a clear example. Examples of first screen applications include video players such as Netflix compatible players.

Discovery server 106 comprises one or more computer programs that implement the functions that are further described herein for responding to and processing requests from the discovery client 112 to discover the availability of compatible applications in first screen devices. In an embodiment, discovery server 106 comprises a DIAL service discovery component 106A and a DIAL REST service component 106B configured to perform the functions that are described further herein. DIAL, in this context, refers to a Discovery and Launch, and indicates the general functions of certain operational units shown in FIG. 1A.

In general, DIAL service discovery component 106A responds to requests of discovery client 112 to discover the discovery server 106 and the DIAL REST service component 106B serves as an interface between application launch requests of the discovery client 112 and an application manager of the first screen device 102. In one embodiment, first screen device 102 further comprises a Universal Plug and Play (UPnP) server 107, or alternatively an HTTP server, that is configured to provide access to information about first screen application 104 and other applications that are hosted at first screen device 102. In an embodiment, UPnP server 107 is configured, through means that are outside the scope of this disclosure, with a device description 109 that indicates metadata of first screen device 102 including a list of available UPnP services. For example, device description 109 may include a "friendlyName" field to provide a name of "Smart HDTV XYZ-900" for first screen device 102. Additionally, an "Application-URL" header field may be provided in a HTTP response to a HTTP request for device description 109. This Application-URL may point to DIAL REST service component 106B of discovery server 106. By concatenating this Application-URL with a specific application name of interest, UPnP client devices such as second screen computing device 110 can query and control first screen application 104 and zero or more other applications hosted at first screen device 102. For naming consistency, UPnP clients may utilize well-defined Application Names that are registered within a DIAL Registry, as discussed in Section 7.0 below. It should be noted that the applications accessible via the Application-URL are separate and distinct from the list of UPnP services provided in device description 109.

Second screen computing device 110 may comprise any of a smartphone, tablet computer, laptop computer, netbook computer, or other computer or workstation. Second screen computing device 110 hosts or executes a discovery client 112 and a second screen app 113. The discovery client 112 implements the functions that are further described herein for initiating discovery requests to discover the first screen device 102 or other video-oriented or entertainment-oriented devices that are coupled to the local network 114. Second screen app 113 may comprise any kind of executable application that can benefit from or use data obtained from or provided to the first screen application 104. For example, second screen app 113 might provide a television program schedule, a media file manager, and/or an internet browser for accessing applications that are hosted on internet servers.

Local network 114 may comprise wired network links, a wireless networking router, or other elements of network infrastructure. In an embodiment, local network 114 is coupled to an access router 116, such as a cable modem, DSL modem, or other access equipment to a public network 118 or internetwork such as the global collection of internetworks known as the internet. Links of local network 114 to first screen device 102 and second screen computing device 110 may comprise wired links or wireless links; for example, access router 116 may represent the combination of a wireless local area network (WLAN) router and a cable modem, DSL modem, or other access equipment, and devices 102, 110 may have compatible wireless network interface cards.

In an embodiment, a discovery repository 120 is coupled to the network 118 and is accessible using networking protocols from the discovery server 106 and discovery client 112. In general the discovery repository 120 comprises a data store such as a relational database, flat file system or other data storage holding centralized information such as known names of widely available first screen applications 104 or second screen apps 113. The configuration and use of the discovery repository 120 is further described herein.

Broken lines in FIG. 1A illustrate virtual communications paths between the discovery client 112 and other elements of FIG. 1A.

3.0 Example Uses

In various embodiments, different methods may be implemented for using the techniques herein for establishing communication between second screen devices and first screen applications in the general manner described in this section.

FIG. 1B illustrates a method of discovering applications according to an embodiment. At block 130, a discovery service client executing on a second screen device initiates a discovery request in a local network to which both the second screen device and one or more first screen devices are coupled. The discovery request specifies a multiscreen service so that listening servers that support multiscreen entertainment-oriented services can recognize and respond to the request. At block 132, the discovery service client receives a discovery response, from one of the first screen devices, identifying the name and location of a discovery server on the first screen device. If the first screen device supports SSDP or UPnP, then the response may come from an SSDP server or UPnP server at the first screen device; other embodiments may implement other servers at the first screen device to recognize and reply to discovery requests that indicate a multiscreen service or the equivalent. At this point, the discovery service client at the second screen device is aware that a compatible server is in the network and can be contacted to obtain further data about particular applications. As further described herein, the discovery server may be implemented using any of several technologies and protocols.

At block 134, the discovery service client requests the discovery server to provide location and, optionally, name information for one or more applications that are available at the first screen device. Block 134 may be accomplished using a two-step process that first identifies a location to call the DIAL REST API and then queries the DIAL REST API for application information. For example, the discovery service client may first send a HTTP request for a UPnP device description of the discovery server. The HTTP response includes the UPnP device description and also includes an Application-URL header field pointing to the DIAL REST API. Next, the Application-URL may be used to query name and/or location information for known installed applications, organized as a structured document or another form of response. In some embodiments, the discovery service client is pre-configured with names of potentially installed applications and requests the discovery server to return information about installed applications of a particular name. Accordingly, the discovery service client can determine whether a specific application is installed at the first screen device by querying the discovery server, for example via concatenation of the Application-URL with the specific application name. In certain embodiments, block 134 may be optionally omitted since the discovery service client can determine whether the specific application is installed based on an action in response to block 136.

At block 136, the discovery service client requests the discovery server to launch a specified application on the first screen device, optionally with one or more specified parameter values. In response, the discovery server may interact with an application manager of an operating system or other facility on the first screen device to cause launching the specified application. In this approach, the discovery service client is not required to be configured with information or code that functions to directly invoke or launch applications on the first screen device. Consequently, the first screen device may use any combination of processor, operating system, or other platform for managing applications without special configuration of the discovery service client or the second screen device or second screen apps, and yet the second screen device will be capable ultimately of launching or invoking applications on the first screen device.

Furthermore, as discussed below in Table 1, various actions may also be carried out in response to the launch request. For example, if the launch request causes a "404 Not Found" action, then the discovery service client may determine that the specific application is not installed.

At block 138, the discovery client provides data identifying the first screen application to a local app executing or hosted on the second screen device. At block 140, the first screen application and second screen app communicate and interact directly via the local network. The discovery client may be configured to perform such communications through URLs or other structured identifiers that can be passed to the first screen application through an intermediary service hosted on the first screen device, as further described herein. As a result, a second screen app can efficiently communicate with a first screen application to coordinate operations, share data, or monitor functions or execution.

In various embodiments, the general methods of FIG. 1B may be implemented as a first screen service, a second screen service, or a cloud-based service in the following example approaches.

3.1 First Screen Service

In one embodiment, a Netflix app running on an iPhone smartphone discovers a Netflix-enabled television, and then causes launching the Netflix app on the TV to enable a user to watch a movie. In this context, "Netflix-enabled television" refers to a television display device with computing capability that already has a Netflix app installed on it. Such an embodiment could involve the following general process:

(a) Netflix app on iPhone discovers discovery service on the networked TV (b) Netflix app on iPhone uses the discovery service to request the networked TV to launch the Netflix app on the TV (c) Netflix app on iPhone discovers Netflix app on TV (d) Netflix app on iPhone and Netflix app on TV communicate to show the movie.

3.2 Second Screen Service

In one embodiment, a YouTube app on an Android tablet discovers a YouTube-enabled TV and then launches the YouTube app on the TV and plays video on the TV; after the video ends, the TV returns to the previously playing TV show. Such an embodiment could involve the following general process:

(a) YouTube app on tablet discovers the discovery service on the networked TV (b) YouTube app on tablet uses the discovery service to ask the TV to launch the YouTube app, passing a network address (such as an IP address and port value) corresponding to the YouTube app on the tablet (c) YouTube app on TV communicates with YouTube app on tablet to show the video, then exits back to the normal TV user interface.

3.3 Cloud-Based Service

In one embodiment, a WebcamX app on an Android-based smartphone discovers a WebcamX-enabled TV and then launches the browser-based HTML5 WebcamX app on the TV to display a webcam stream. In this example, the WebcamX app is a fictitious example that is described for purposes of illustrating a workable, potential use of the techniques herein. Such an embodiment could involve the following general process:

(a) WebcamX app on phone discovers discovery service on the networked TV (b) WebcamX app on phone uses the discovery service to request the TV to launch an HTML5-based browser starting with the URL for the WebcamX app, passing a unique token based on a random or pseudo-random number (c) WebcamX app on phone communicates with WebcamX app on TV using a cloud-based WebcamX server, using the unique token to enable the server to correctly route traffic between the two apps.

4.0 Overview of Example Discovery Method

For purposes of illustrating clear examples, certain sections of this disclosure use particular terms as shorthand, such as DIAL. However, other embodiments may implement functionally equivalent methods or mechanisms using different names, labels, or identifiers and therefore terms such as DIAL are provided merely as examples.

In one embodiment, the techniques herein may be implemented through a DIAL service discovery component 106A and a DIAL REST service component 106B. REST, in this context, refers to the Representational State Transfer style of software architecture for distributed systems. While the use of a REST service is described herein for purposes of describing a clear example, in other embodiments, SOAP or WSDL may be used. In one embodiment, the DIAL service discovery component enables a discovery client device to discover discovery servers on its local network segment and obtain access to the DIAL REST service on those devices.

In one embodiment, the DIAL REST service enables a discovery client to query, launch and optionally stop applications that are hosted or running on a discovery server device.

5.0 Dial Service Discovery

In one embodiment, the DIAL service discovery component 106A is implemented using a specified Search Target within messages structured with SSDP (Simple Service Discovery Protocol), and a specified header in the response to an HTTP (Hypertext Transfer Protocol) request for a UPnP (Universal Plug and Play) device description. The SSDP protocol is described in UPnP Device Architecture 1.1, 15 Oct. 2008, available at the time of this writing in the folder /sdcps-and-certification/standards/device-architecture-documents/ of the HTTP server upnp.org.

In one embodiment, the DIAL REST service component 106B is accessed using HTTP, as described in R. Fielding et al., "Hypertext Transfer Protocol—HTTP/1.1," Request for Comment (RFC) 2616, June 1999, published by The Internet Society. In one embodiment, discovery clients and discovery servers support the requirements of section 2.1 of the UPnP protocol and, in particular, HTTP 1.0 is typically always supported and HTTP 1.1 may be supported.

The effect of this arrangement is that an existing UPnP server on a first screen device is supported if it is available, but it is not essential to have in the first screen device. Alternatively, the first screen device could implement an HTTP server to provide equivalent functions. Further, the arrangement herein facilitates efficient discovery of the first screen application 104 by the discovery client 112 and second screen app 113, using well-defined communication mechanisms that are compatible with emerging Web interaction standards.

Figures 2, 3, 4:
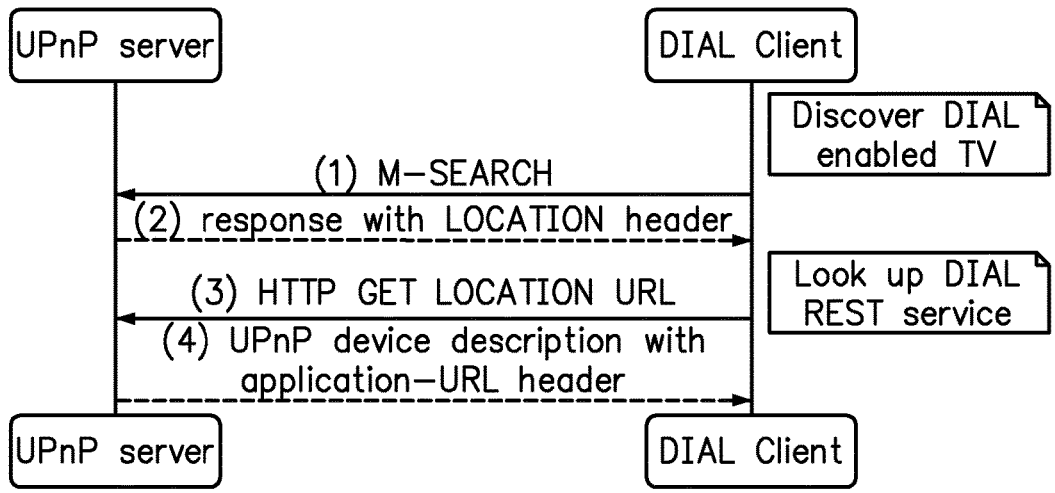
FIG. 2 is a message sequence diagram that illustrates one implementation of the DIAL service discovery component.
FIG. 3 is an example of an M-SEARCH request.
FIG. 4 is an example of an M-SEARCH response.

FIG. 2 is a message flow diagram that illustrates one implementation of the DIAL service discovery component. In FIG. 2, a series of messages are passed over a network between a UPnP server and a DIAL client, which may correspond respectively to UPnP server 107 and discovery client 112 of FIG. 1A.

Message (1) of FIG. 2 is an M-SEARCH request, an example of which is shown in FIG. 3. In an embodiment, a discovery client attempting to discover one or more discovery servers sends an M-SEARCH request as defined in section 1.3.2 of the UPnP Device Architecture over UDP to the multicast address 239.255.255.250 and UDP port 1900. As seen in FIG. 2, the request is directed to a UPnP server on the first screen device, to enable leveraging UPnP server capabilities for those first screen devices that support UPnP. The request includes a Search Target (ST) header with the following value: urn:dial-multiscreen-org:service:dial:1

In other embodiments, different ST values may be used and the particular example value provided above is not critical. While the multicast address given above is for IPv4, in other embodiments, a similar process may be used for IPv6 addresses based on an equivalent multicast address that is compatible with IPv6.

Message (2) of FIG. 2 is an M-SEARCH response, an example of which is shown in FIG. 4. In an embodiment, a SSDP server or UPnP server receiving an M-SEARCH request comprising the ST header defined above responds as defined in section 1.3.3 of the UPnP Device Architecture. The response comprises a LOCATION header containing an absolute HTTP URL for the UPnP description of the root device. The root device is referenced to ensure returning a highest-order UPnP description applicable to the first screen device 102 rather than a description for a subordinate service that is also running on the first screen device. The host portion of the URL either resolves to an IP address, or comprises an IP address. The ST header of the response contains the same identifier as specified in the preceding paragraph. As shown in FIG. 2, once message (2) is received by the DIAL client, the process of discovering a DIAL enabled TV is completed.

Figures 5, 6, 7:
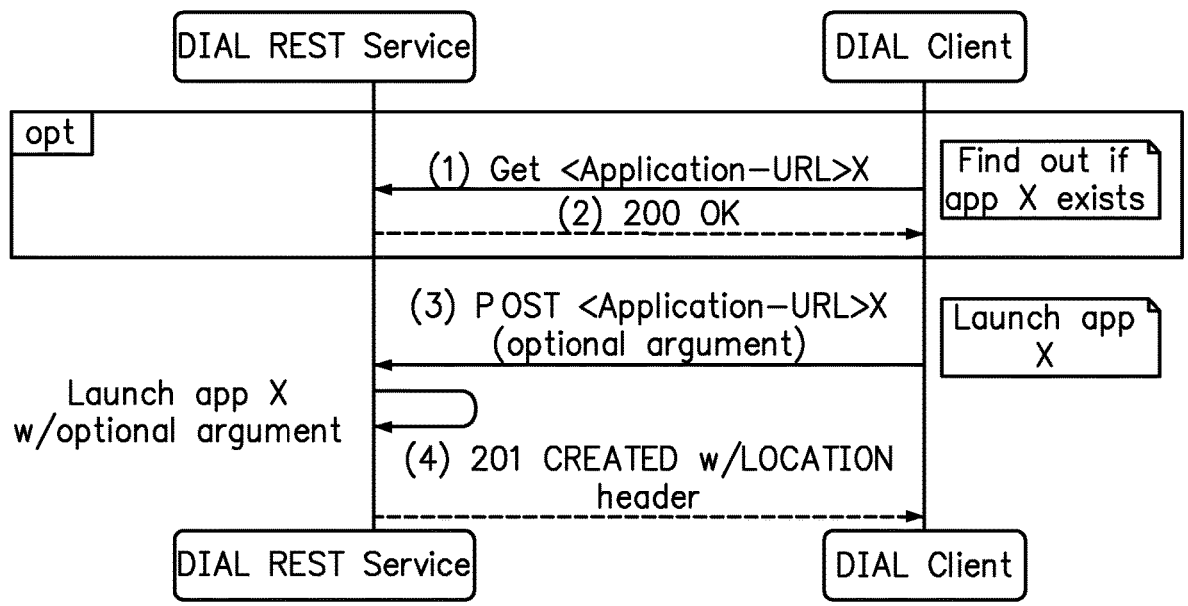
FIG. 5 is an example of a device description request.
FIG. 6 is an example of a device description response.
FIG. 7 is a message sequence diagram illustrating application launch.

Message (3) of FIG. 2 is a device description request, an example of which is shown in FIG. 5. In an embodiment, in response to receiving the M-SEARCH response shown as message (2), the discovery client sends an HTTP GET request to the URL that was received in the LOCATION header of the M-SEARCH response. In an embodiment, matching of SSDP header field names is not case sensitive.

Message (4) of FIG. 2 is a device description response, an example of which is shown in FIG. 6. In an embodiment, in response to receiving a valid HTTP GET request for the device description, a discovery server responds with an HTTP response that comprises the UPnP device description as defined in section 2 of the UPnP Device Architecture. In addition, in an embodiment, the request is not redirected. If the request is successful, then the HTTP response contains a header field denoted Application-URL, the value of which is an absolute HTTP URL identifying the DIAL REST service, referred to herein as the DIAL REST service URL. The host portion of the URL either specifies an IP address or resolves to an IP address. As shown in FIG. 2, once message (4) is received by the DIAL client, the process of looking up a DIAL REST service is completed.

In an embodiment, in ABNF notation, the format of the Application-URL header is: Application-URL="Application-URL" ":" absoluteURI In an embodiment, a discovery client receiving such a response uses the provided URL to access the DIAL REST service as further described herein. In an embodiment, the "friendlyName" field of the device description, as defined in UPnP, may be used for presentation in the discovery client device user interface; for example, such names may be shown in lists or menus that offer users a choice of discovery server devices to interact with.

Using the foregoing approach, a second screen client computer can first discover the existence of a responsive discovery service at a first screen device, and then learn the location of other information describing applications that are available on the first screen device. Thereafter, the second screen client computer can selectively invoke one or more of the applications of the first screen device to perform functions of interest, using an intermediary such as the DIAL REST service component to interface to an application manager of the first screen device 102.

6.0 Dial Rest Service

6.1 Application Resources

In an embodiment, the DIAL REST component 106B interoperates with applications (for example, Netflix or YouTube) as resources that are identified by URLs. Operations related to a particular application are performed by sending HTTP requests based on the particular URL for that particular application, which may be denoted an Application Resource URL. While the DIAL REST component 106B is illustrated as an example, other embodiments may use alternatives to REST including SOAP, a proprietary TCP-based protocol, or an instant messaging Jabber-style protocol based on XMPP.

In an embodiment, the Application Resource URL is formed by concatenating the Application-URL and the Application Name. In this context, the platform application manager is any functional unit of the first screen device 102 that is responsible for launching applications, forking or spawning processes, acting as an executive, or performing similar functions; the application manager may be a unit or service of the operating system that controls first screen device 102.

The Application Name for each application is defined by the application provider. Application Names are registered in the DIAL Registry that is further described in section 7 of this disclosure.

6.2 Launching an Application

FIG. 7 is a message sequence diagram illustrating application launch. In FIG. 7, a series of messages are passed over a network between a DIAL REST service and a DIAL client, which may correspond respectively to DIAL REST service component 106B and discovery client 112 of FIG. 1A.

Prior to sending an application launch request, the DIAL client may first optionally verify an existing installation of a specific application by sending message (1), or an Application Information Request. If a message (2) indicating a "20 OK" is received from the DIAL REST service in response, then the DIAL client can proceed to send message (3). However, if a different message (2) is received, then the DIAL client may respond accordingly, as discussed further below in conjunction with FIG. 10, FIG. 11A, FIG. 11B, and Table 2. For example, if the specific application is not installed but is installable, then the DIAL client may initiate an installation of the specific application, allowing the verification to succeed.

In an embodiment, as shown in message (3) of FIG. 7, a discovery client attempting to launch an application on a discovery service sends an application launch request in the form of an HTTP POST request to the Application Resource URL for the desired application, an example of which is shown in FIG. 8. In an embodiment, which applications are available to launch using the methods herein are configured at the discretion of the party that is implementing the discovery server. In various embodiments, the discovery server may make one, some, or all applications running on the first screen device available for invocation using the techniques herein. The message body of the POST request may be empty, or may contain an argument string to be passed to the application on launch. In an embodiment, if the message body of the POST request is non-empty, then the MIME type is "text/plain", the character encoding typically is UTF-8 and the character encoding is indicated explicitly by including the "charset" MIME parameter.

In various embodiments, how the argument string is passed to the application may be implemented differently in various platforms and applications, and is not critical or within the scope of this disclosure. The format of the argument should match the requirements of the application that is launched. For example, key-value pairs, JSON, or XML may be used and the particular selection of argument format is not critical. In an embodiment, a discovery server may pass the argument string directly to the application, and applications do not assume that any security checks have been performed. Therefore, applications typically perform their own security checks on the argument data. Example security checks include character encoding checks.

In response to receiving a valid POST request, a discovery server first extracts the Application Name from the POST URL. If the POST URL is invalid or cannot be processed to extract the Application Name, then the discovery server returns an HTTP response code as specified in the HTTP protocol specification.

In an embodiment, as shown in message (4) of FIG. 7, a discovery service sends an application launch response to the discovery client in the form of an HTTP response, an example of which is shown in FIG. 8. The discovery server performs a plurality of responsive actions depending upon factors such as: whether the Application Name is not recognized; whether the content length of the message body exceeds the maximum size supported by the discovery server; the current application state including Not Started (application is not running), Starting (the application is undergoing a restart due to another DIAL REST service request or for another reason); Running (the application is running); whether the message body is empty. The specific responsive action may be reflected in the application launch response. TABLE 1 summarizes actions that may be implemented in an embodiment.

TABLE 1

Application Start Actions

| Precedence | Application Recognized | Message Body | Application State | Action |
|---|---|---|---|---|
| 1 | No | Any | n/a | 404 Not Found |
| 2 | Yes | Too long | n/a | 413 Request entity too large |
| 3 | Yes | Empty | Not running | 201 Created Start application |
| 4 | Yes | Non-empty | Not running | 201 Created Start application with provided argument, if any |
| 5 | Yes | Empty | Starting | No action |
| 6 | Yes | Non-empty | Starting | No action |
| 7 | Yes | Empty | Running | No action |
| 8 | Yes | Non-empty | Running | Provide new argument to app |

If the application is running after the action specified above, then the discovery server returns an HTTP response with response code 201 Created, as shown by message (4) in FIG. 7. In this case, the header of the response contains an absolute URL identifying the running instance of the application, denoted the Application Instance URL. The host portion of the URL is either an IP address or resolves to an IP address and the response body is null.

Otherwise—for example, if the application cannot be started or re-started successfully, the discovery server returns an HTTP response with response code 503 Service Unavailable. In various embodiments, if the application is already running and an argument is provided, and the first screen device does not support providing new arguments to running applications, then the application may be restarted with the new argument. Further, to run the application, the host system typically uses a non-blocking form of fork, exec, spawn, or the equivalent that will trap any immediate system error and cause returning an HTTP 503 Service Unavailable error. If no error occurs and the system command to run the application succeeds, then the application is running for purposes of this disclosure. Accordingly, the check for an existing installation of the specific application in messages (1) and (2) of FIG. 7 may be optionally omitted, as the receiving of a 404 Not Found or a 503 Service Unavailable in the application launch response message (4) can indicate the availability of the specific application.

The Application Instance URL may be used to request information about and to stop the running instance of the application, as further described herein.

6.3 Stopping an Application

In an embodiment, a discovery client attempting to stop a running instance of an application on a discovery server sends an HTTP DELETE request to the Application Instance URL. In an embodiment, a discovery server optionally supports the HTTP DELETE request to permit stopping application instances. If the DELETE request is not supported, then the discovery server returns an HTTP response with response code 501 Not Implemented. If the HTTP DELETE request is supported, then in response to receiving a DELETE request, the discovery server first determines whether the URL in the request corresponds to a running application instance. If so, then the discovery server sends a response with the appropriate HTTP response code as defined in the HTTP specification. If the provided URL does not correspond to an application instance that is currently running, then the server returns an HTTP response with response code 404 Not Found.

Otherwise, the discovery server sends an HTTP response with response code 200 OK and attempts to stop the running application; these operations may be carried out asynchronously.

6.4 Querying for Application Information

In an embodiment, a discovery client that wishes to discover information about an application sends an HTTP GET request to the Application Resource URL, as described in Section 6.1 above. FIG. 10 illustrates an Application Information Request.

In an embodiment, in response to receiving such a GET request, the discovery server first extracts the Application Name from the request URL. If the GET request is invalid or cannot be processed to extract the Application Name, then the discovery server returns the appropriate HTTP response code as defined in the HTTP specification.

If the Application Name is not recognized, then the server returns an HTTP response with response code 404 Not Found.

Otherwise, the discovery server sends an application information response in the form of a HTTP response with response code 200 OK, an example of which is shown in FIG. 11B. The MIME type of the response may be "text/xml" and the character encoding may be UTF-8 and can be indicated using the "charset" MIME parameter. The XML document may conform to the schema set forth in FIG. 11A, except that the discovery client is configured to ignore unrecognized XML elements and attributes. TABLE 2 summarizes the semantics of the schema for one example embodiment.

TABLE 2

Application Info Schema Summary

| Element or Attribute | Definition |
|---|---|
| Name | Contains the Application Name |
| Options | |
| @allowStop | If true, indicates that the DELETE operation described above is supported. If false, indicates that the DELETE operation is not supported. |
| State | "running" indicates that the application is installed and running. "stopped" indicates that the application is installed and not running. A string beginning "installable=" indicates that the application is not installed, but is available for installation. Any other value is invalid and is ignored. |
| Link | Optional element that should be included when an application is running. The exception is when stopping an application is not supported; in that case, <link> does not need to be provided. The value of the "rel" attribute is "run". The "href" attribute contains the resource name of the running application, such as "run" or "pid-25352". This name typically matches the last portion of the name returned in the 201 Created response. |

6.5 Triggering Installation of an Application

In an embodiment, discovery servers may support client triggering of application installation for specific applications that are not currently installed.

In an embodiment, if the Application Name is recognized, the application is not installed and the discovery server supports client triggering of application installation for this particular application, then the discovery server returns a "state" element beginning with the string "installable=". The remainder of the element contains an absolute URL. The host portion of the URL is an IP address or resolves to an IP address. Thereafter, a discovery client may initiate installation of the application on the discovery server by sending an HTTP GET request to the specified URL.

In response to receiving such a request at the discovery server, if the Application Name is recognized, and the application is not installed and the discovery server does not support triggering of application installation for the specified Application Name, then the discovery server returns an HTTP response with response code 404 Not found.

In an embodiment, if an application is installable, then the discovery client can select whether to request the installable URL that is provided, through a GET request. For example, a second screen app, hosted on the same computer on which the discovery client is running, may generate a user interface message such as, "Application is not installed. Would you like to install it now?" The process by which the first screen device handles the installation request is beyond the scope of this disclosure and various options include immediate installation of the app, presentation of the app in a marketplace or purchase facility, etc.

7.0 Discovery Registry

In an embodiment, to ensure that the correct name for each application is well-defined, and to avoid naming conflicts, Application Names are registered in a data repository termed a DIAL Registry. In an embodiment, a service provider maintains the registry, which is available to any other party that implements a discovery server or discovery client as described herein. Application Names may be registered explicitly, or a set of Application Names having a common prefix may be registered by registering only an Application Prefix.

In an embodiment, each Application Name and Application Prefix comprises a sequence of characters that match the "pchar" production described in Berners-Lee (RFC 3986), referenced above. In some embodiments, an Application Prefix comprises a recognizable company name, for example, "Acme," "com.acme," etc.

In an embodiment, Application Names may be registered if the application is actually available in the market and there is no conflict with previously registered names or prefixes. Application prefixes can be registered if the company name in the prefix is actively delivering applications or devices that run them to the market. Names or prefixes that may be confused with previous registrations or are not intended for use with the discovery services described herein should not be registered.

8.0 Implementation Example—Hardware Overview

Figure 12:
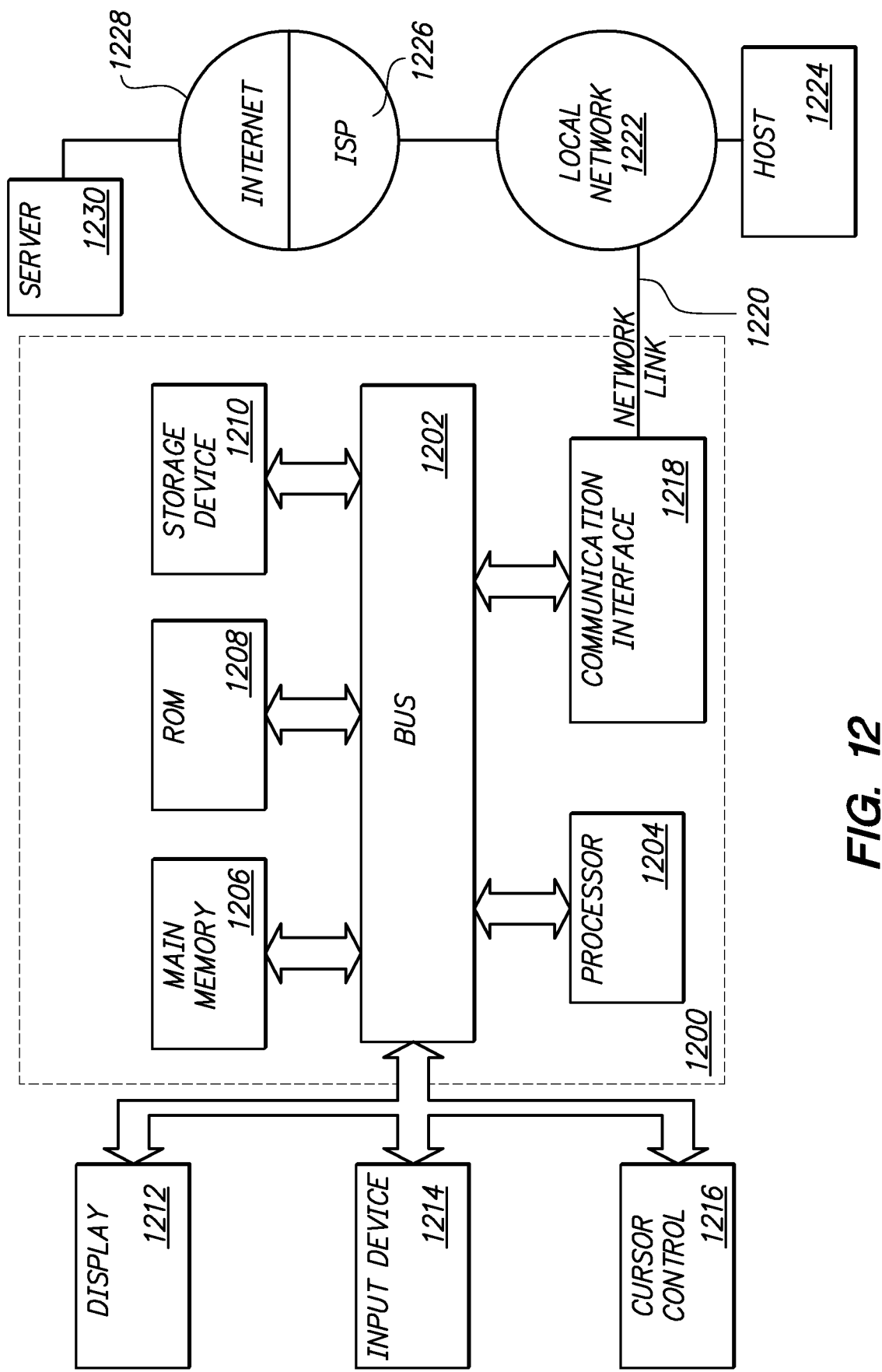
FIG. 12 illustrates a computer system with which an embodiment may be implemented.

FIG. 12 is a block diagram that illustrates a computer system 1200 upon which an embodiment of the invention may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The invention is related to the use of computer system 1200 for implementing the techniques described herein. According to one embodiment of the invention, those techniques are performed by computer system 1200 in response to processor 1204 executing one or more sequences of one or more instructions contained in main memory 1206. Such instructions may be read into main memory 1206 from another machine-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1200, various machine-readable media are involved, for example, in providing instructions to processor 1204 for execution. Such a medium may take many forms, including but not limited to storage media and transmission media. Storage media includes both non-volatile media and volatile media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are exemplary forms of carrier waves transporting the information.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution. In this manner, computer system 1200 may obtain application code in the form of a carrier wave.

9.0 Other Aspects of Disclosure

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Aspects of the subject matter described herein are set out in the following numbered clauses:

1. A method comprising: initiating a discovery request in a network; receiving, in response to the discovery request, a discovery response identifying a discovery server on a first-screen device; sending a launch request to the discovery server to cause, on the first-screen device, a launching of a specific application; identifying the specific application to a local application executing on a second-screen device; and causing, through the network, an interaction between the local application and the specific application; wherein the method is performed on one or more computing devices.

2. The method of clause 1, wherein the one or more computing devices is the second-screen device.

3. The method of any of clause 1-2, wherein the interaction comprises showing a movie on the first-screen device using the specific application, wherein the movie is selected using the local application.

4. The method of any of clause 1-3, wherein the interaction comprises showing a video on the first-screen device using the specific application, wherein the video is selected by passing a network address corresponding to the local application from the local application to the specific application.

5. The method of clause 4, wherein the specific application is exited after the showing of the video.

6. The method of any of clause 1-5, wherein the specific application is a browser-based application executing within a web browser of the first-screen device, and wherein the launch request specifies a network address of the browser-based application.

7. The method of clause 6, wherein the network address of the browser-based application is a cloud address outside of the network.

8. The method of any of clauses 1-7 further comprising, prior to the sending of the launch request: verifying an availability of the specific application by sending an application information request to the discovery server and checking an application information response from the discovery server.

9. The method of clause 8, wherein the checking of the application information response indicates that the specific application is not installed but is installable, and wherein the verifying is in response to initiating an installing of the specific application.

10. The method of any of clauses 1-9, wherein the network is a local network.

11. The method of any of clauses 1-10, wherein the discovery server is selected from a plurality of discovery servers.

12. The method of any of clauses 1-11, wherein the discovery response identifies a location and a name of the discovery server.

13. The method of any of clauses 1-12, wherein the discovery request is sent using Universal Plug and Play (UPnP).

14. The method of any of clauses 1-13, wherein the launch request further includes one or more specified parameter values.

15. The method of any of clauses 1-14 wherein the first-screen device comprises any of a television, set-top box, game console, digital video recorder, disc player, or similar device primarily capable of playing or generating a visual display of an audiovisual program.

16. The method of any of clauses 1-15 wherein the second-screen device comprises any of a smartphone, tablet computer, laptop computer, netbook computer, or other general purpose computing device or workstation.

17. A non-transitory computer-readable data storage medium storing one or more sequences of instructions which when executed cause one or more processors to perform any of the methods recited in clauses 1-16.

18. A computer program product including instructions which, when implemented on one or more processors, carries out any of the methods recited in clauses 1-16.

19. A second-screen computing device having a processor configured to perform any of the methods recited in clauses 1-16.

What is claimed is:

1. A method comprising:
   initiating, from a discovery client on a second-screen device, a discovery request in a network;
   receiving, at the discovery client, from a first-screen device in response to the discovery request, a discovery response identifying a first network address that points to an interface component executing on a discovery server on the first-screen device, wherein the first-screen device is a consumer electronic video device;
   determining, at the discovery client, an application network address associated with a specific application executing on the first-screen device by concatenating the first network address identified in the discovery response and an application identifier associated with the specific application and retrieved from an application registry storing a plurality of registered application identifiers;
   sending, through the network, a launch request from the second-screen device to the discovery server to cause, on the first-screen device, a launching of the specific application, wherein the launch request includes the application network address;
   receiving from the discovery server, at the discovery client, data identifying the specific application to a local application, among a plurality of local applications, executing on the second-screen device;
   causing, through the network, an interaction between the local application and the specific application;
   wherein the method is performed on one or more processors.

2. The method of claim 1, wherein the second-screen device comprises the one or more processors.

3. The method of claim 1, further comprising receiving, through the local application at the second-screen device, input selecting a movie;
   wherein the interaction comprises sending, from the local application executing on the second-screen device, to the specific application executing on the first-screen device, a new request to play the movie on the first-screen device using the specific application.

4. The method of claim 1, wherein the interaction comprises passing a network address corresponding to the local application from the local application to the specific application.

5. The method of claim 3, wherein the specific application is exited after showing of the movie.

6. The method of claim 1, wherein the specific application is a browser-based application executing within a web browser of the first-screen device, and wherein the application network address comprises a web address of the browser-based application.

7. The method of claim 1, wherein the application network address comprises a cloud address outside of the network.

8. The method of claim 1, further comprising, prior to the sending of the launch request, verifying an availability of the specific application by sending, from the discovery client on the second-screen device, to the discovery server on the first-screen device, an application information request to the discovery server, and in response, receiving an application information response, at the discovery client on the second-screen device, from the discovery server on the first-screen device, wherein the application information response identifies one or more applications installed on the first-screen device.

9. The method of claim 8, further comprising determining that the specific application is not among the one or more applications installed on the first-screen device, but is installable, and initiating an installing of the specific application on the first-screen device.

10. The method of claim 1, wherein the network is a local network.

11. The method of claim 1, wherein the discovery request is sent to a plurality of network addresses, a plurality of discovery servers respond to the discovery request, and the discovery client selects the discovery server from the plurality of discovery servers.

12. The method of claim 1, wherein the discovery request is sent from the second-screen device to the first-screen device, the discovery response is received at the second-screen device from the first-screen device, and the discovery response identifies a location and a name of the discovery server.

13. The method of claim 1, wherein the discovery request is sent using Universal Plug and Play (UPnP).

14. The method of claim 1, wherein the discovery request further includes one or more parameter values that identify a type of service, and the discovery response indicates that the discovery server is the type of service.

15. The method of claim 1, wherein the first-screen device comprises any of a television, set-top box, game console, digital video recorder, disc player, or similar device primarily capable of playing or generating a visual display of an audiovisual program.

16. The method of claim 1, wherein the second-screen device comprises any of a smartphone, tablet computer, laptop computer, netbook computer, or other general purpose computing device or workstation.

17. A non-transitory computer-readable data storage medium storing one or more sequences of instructions which when executed cause one or more processors to perform, in a second-screen device:

initiating, from a discovery client on a second-screen device, a discovery request in a network;

receiving, at the discovery client, from a first-screen device in response to the discovery request, a discovery response identifying a first network address that points to an interface component executing on a discovery server on the first-screen device, wherein the first-screen device is a consumer electronic video device;

determining, at the discovery client, an application network address associated with a specific application executing on the first-screen device by concatenating the first network address identified in the discovery response and an application identifier associated with the specific application and retrieved from an application registry storing a plurality of registered application identifiers;

sending, through the network, a launch request to the discovery server to cause, on the first-screen device, a launching of the specific application, wherein the launch request includes the application network address;

receiving from the discovery server, at the discovery client, data identifying the specific application to a local application, among a plurality of local applications, executing on the second-screen device;

causing, through the network, an interaction between the local application and the specific application.

18. The non-transitory computer-readable data storage medium of claim 17, wherein the one or more sequences of instructions further cause the one or more processors to receive, through the local application at the second-screen device, input selecting a movie;

wherein the interaction comprises sending, from the local application executing on the second-screen device, to the specific application executing on the first-screen device, a new request to play the movie on the first-screen device using the specific application.

19. The non-transitory computer-readable data storage medium of claim 17, wherein the interaction comprises passing a network address corresponding to the local application from the local application to the specific application.

20. A computing device configured to act as a second-screen device and comprising:

one or more processors;

a video display unit coupled to the one or more processors;

a non-transitory computer-readable data storage medium coupled to the one or more processors and storing one or more sequences of instructions which when executed cause the one or more processors to:

initiate, from a discovery client on a second-screen device, a discovery request in a network;

receive, at the discovery client, from a first-screen device in response to the discovery request, a discovery response identifying a first network address that points to an interface component executing on a discovery server on the first-screen device, wherein the first-screen device is a consumer electronic video device;

determine, at the discovery client, an application network address associated with a specific application executing on the first-screen device by concatenating the first network address identified in the discovery response and an application identifier associated with the specific application and retrieved from an application registry storing a plurality of registered application identifiers;

send, through the network, a launch request from the second-screen device to the discovery server to cause, on the first-screen computing device, a launching of the specific application, wherein the launch request includes the application network address;

receiving from the discovery server, at the discovery client, data identifying the specific application to a local application, among a plurality of local applications, executing on the second-screen device;

cause, through the network, an interaction between the local application and the specific application.

* * * * *